United States Patent
Bause et al.

(10) Patent No.: US 6,726,751 B2
(45) Date of Patent: Apr. 27, 2004

(54) ACCORDION-PLEATED FILTER MATERIAL AND FILTER ELEMENT INCORPORATING SAME

(76) Inventors: Daniel E. Bause, Honeywell International Inc. 101 Columbia Rd., Morristown, NJ (US) 07962; Ronald P. Rohrbach, Honeywell International Inc. 101 Columbia Rd., Morristown, NJ (US) 07962; Gordon W. Jones, Honeywell Filter & Spark Plugs, CPG 28399 Cedar Park Blvd., Perrysburg, OH (US) 43551; Peter D. Unger, Honeywell International Inc. 101 Columbia Rd., Morristown, NJ (US) 07962; Alexander Lobovsky, Honeywell International Inc. 101 Columbia Rd., Morristown, NJ (US) 07962

( * ) Notice: Subject to any disclaimer, the term of this patent is extended or adjusted under 35 U.S.C. 154(b) by 0 days.

(21) Appl. No.: 10/014,102

(22) Filed: Nov. 13, 2001

(65) Prior Publication Data

US 2003/0089092 A1 May 15, 2003

(51) Int. Cl.$^7$ ............................ B01D 39/00; B01D 29/07
(52) U.S. Cl. ............................ 96/134; 96/153; 55/497; 55/514; 55/521; 55/527; 210/493.5; 210/503; 210/505; 210/508
(58) Field of Search .................... 96/134, 135, 154, 96/153; 55/315, 497, 512, 514, 521, 527; 210/493.1, 493.3, 493.5, 503, 504, 505, 508, 509; 427/485

(56) References Cited

U.S. PATENT DOCUMENTS

| | | |
|---|---|---|
| 2,019,186 A | 10/1935 | Kaiser |
| 2,038,071 A * | 4/1936 | Wilhelm ...................... 239/59 |
| 2,732,951 A | 1/1956 | De Puiffe De Magondeau |
| 3,019,127 A | 1/1962 | Czerwonka et al. |
| 3,430,420 A * | 3/1969 | Gross .......................... 53/436 |
| 3,971,373 A | 7/1976 | Braun |
| 4,537,812 A | 8/1985 | Elbers |
| 4,842,739 A | 6/1989 | Tang |
| 5,057,368 A | 10/1991 | Largman et al. |
| 5,149,468 A | 9/1992 | Hershelman |
| 5,352,274 A | 10/1994 | Blakley |
| 5,486,410 A * | 1/1996 | Groeger et al. .............. 428/331 |
| 5,595,659 A * | 1/1997 | Huang et al. ............ 210/502.1 |
| 5,704,966 A | 1/1998 | Rohrbach et al. |
| 5,713,971 A | 2/1998 | Rohrbach et al. |
| 5,744,036 A * | 4/1998 | Choi .......................... 156/292 |
| 5,744,236 A | 4/1998 | Rohrbach et al. |
| 5,759,394 A | 6/1998 | Rohrbach et al. |
| 5,810,898 A | 9/1998 | Miller |
| 5,891,221 A | 4/1999 | Rohrbach et al. |
| 5,902,384 A | 5/1999 | Rohrbach et al. |
| 5,951,744 A | 9/1999 | Rohrbach et al. |

(List continued on next page.)

FOREIGN PATENT DOCUMENTS

JP      11-165008 A    *   6/1999

Primary Examiner—Frank M. Lawrence (57) ABSTRACT

A filter material includes a filter pad made from a thin, nonwoven fiber mat which has been accordion-pleated, compressed into a unit having a large number of substantially parallel interconnected filter strips, and treated to retain the filter strips in substantially parallel relation to each other. In a preferred embodiment, activated carbon particles are operatively associated with the filter pad. Selected fibers of the nonwoven fiber material are hollow fibers, each having an outer surface, a hollow internal cavity, and an extended slot formed therein, between the hollow internal cavity and the outer fiber surface. Carbon particles may be located between selected filter strips, and additional carbon particles may be disposed within the cavities of the hollow fibers. Methods of forming the filter material, and a filter element made with the filter material are also disclosed.

8 Claims, 8 Drawing Sheets

U.S. PATENT DOCUMENTS

| | | | |
|---|---|---|---|
| 5,968,214 A | * 10/1999 | Nagata et al. | 422/120 |
| 6,004,381 A | 12/1999 | Rohrbach et al. | |
| 6,048,614 A | 4/2000 | Rohrbach et al. | |
| 6,113,784 A | 9/2000 | Stoyell et al. | |
| 6,117,802 A | 9/2000 | Rohrbach et al. | |
| 6,127,036 A | 10/2000 | Xue et al. | |
| 6,273,938 B1 | 8/2001 | Fanselow et al. | |
| 6,294,222 B1 | * 9/2001 | Cohen et al. | 427/213 |
| 6,296,821 B1 | * 10/2001 | Hendricks et al. | 210/502.1 |
| 6,302,946 B1 | * 10/2001 | Cronia et al. | 55/524 |
| 6,375,699 B1 | * 4/2002 | Beck | 264/257 |
| 6,379,438 B1 | * 4/2002 | Schneider et al. | 156/73.1 |
| 6,379,564 B1 | * 4/2002 | Rohrbach et al. | 210/209 |
| 6,447,584 B1 | * 9/2002 | Kishkovich et al. | 55/524 |
| 6,514,306 B1 | * 2/2003 | Rohrbach et al. | 55/524 |

* cited by examiner

ACCORDION-PLEATED FILTER MATERIAL AND FILTER ELEMENT INCORPORATING SAME

BACKGROUND OF THE INVENTION

1. Field of the Invention

The present invention relates to filter media, to methods of making filter media, and to filter elements made using the described filter media. More particularly, the present invention relates to accordion-pleated filter material in which adjacent filter strip sections are substantially parallel to one another.

2. Description of the Background Art

A number of different filter media are known for filtering fluids. Examples of some issued patents relating to filter materials, and to known fluid filter designs, include U.S. Pat. No. 2,019,186 to Kaiser, U.S. Pat. No. 2,732,951 to R. De Puiffe De Magondeau, U.S. Pat. No. 3,019,127 to Czerwonka et al., U.S. Pat. No. 3,971,373 to Braun, U.S. Pat. No. 4,537,812 to Elbers, U.S. Pat. No. 4,842,739 to Tang, U.S. Pat. No. 5,149,468 to Hershelman, U.S. Pat. No. 5,352,274 to Blakley, U.S. Pat. No. 5,810,898 to Miller, U.S. Pat. No. 6,113,784 to Stoyell et al., and U.S. Pat. No. 6,273,938 to Fanselow et al.

The assignee of the present invention has developed a new type of hollow 'wicking' fiber material that has been used for some filter applications. This material includes hollow spaces within the individual fibers, and this hollow space may be used to house a reactive or adsorbent material. Some issued patents relating to this wicking fiber, and to filters containing this type of fiber include U.S. Pat. Nos. 5,057,368, 5,704,966, 5,713,971, 5,744,236, 5,759,394, 5,891,221, 5,902,384, 5,951,744, 6,004,381, 6,048,614, 6,117,802, and 6,127,036. Other patents using this fiber technology are pending.

Although the known filter media are usable for their intended purposes, a need still exists in the art for an improved filter material which is minimally restrictive of a fluid being filtered.

It would be advantageous if such a filter material included some activated carbon to aid in the effectiveness thereof.

SUMMARY OF THE INVENTION

The present invention provides a filter material, a method of making the filter material, and a filter element incorporating the filter material.

The filter material of the present invention is useful for filtering fluids, and includes at least one filter pad, made using a thin sheet of nonwoven fiber material, which is folded many times back and forth, as further described herein.

The filter pad is a lightweight, elastically resilient pad which is generally compressible and deformable, but which tends to spring back to its original shape after compression, distortion or bending. In one particular embodiment of the invention, the filter pad is roughly box-shaped, including top, bottom, front, rear, and two opposed side surfaces.

The filter pad is formed from at least one thin, substantially flat fibrous sheet, which has been accordion-pleated, compressed into a unit made up of a multiplicity of interconnected, substantially parallel thin strips, and heated to substantially fix the strips in substantially parallel relation. Optionally, carbon particles may be applied to a portion of the fiber sheet before the folding operation thereon. The thin filter strips making up the filter material are oriented substantially parallel to one another, within the filter pad. Preferably, the finished filter material includes between 50–300 layers of filter strips per inch.

In one particular embodiment of the invention, two thin fibrous mats are placed in parallel with a layer of carbon particles sandwiched therebetween. The resulting layered material is then accordion-folded as previously described, and the double layer of fibrous material helps to trap the carbon and hold it in place.

The filter pad is adapted to filter fluid material passing inwardly through the front surface and outwardly through the rear surface thereof, the filtrate flowing directionally such that some of the filtrate passes between adjacent filter strips thereof, and in a direction which is generally parallel to the filter strips.

Preferably, in the practice of the present invention, the filter strips within the filter pad are very closely spaced next to, or are in side-to-side contact with one another, and are substantially parallel, as noted.

Optionally, in a preferred embodiment of the invention, the material of the filter pad may further include carbon particles held between selected filter strips. Where used, the carbon particles are preferably applied as a coating on at least one surface of the flat starting material, before it is pleated. The carbon may be sprayed on as a powder, and may be conventionally sprayed, or may be electrostatically applied. Then, after the carbon has been applied to the flat sheet, it is accordion-pleated, thereby trapping the carbon between adjacent strip surfaces.

Another optional feature of the filter material hereof is that selected fibers, of the nonwoven fiber starting material, may be hollow fibers. The portion of hollow fibers in the material, where used, is preferred to be between 5 percent and 80 percent, by weight, of the total fibers. Each of these hollow fibers has a hollow internal cavity formed therein, and has at least one extended slot formed therein, parallel to the longitudinal axis thereof. The hollow internal cavity of the fiber is able to communicate with the outer fiber surface by way of this extended slot.

In a particularly preferred version of the hollow fibers, each of the fibers includes a central stem and a plurality of substantially T-shaped lobes extending radially outwardly from the stem. Where this type of fiber is used, a number of lobes between two and five is preferred.

An added benefit of using this type of hollow fiber in the filter material, is that some of the hollow fibers may have fine carbon particles trapped inside the hollow internal cavities thereof. This additional carbon material, within the fibers, provides extra effectiveness and longevity to the filter material hereof.

It will therefore be understood that the filter material hereof may include two separate and distinct phases of activated carbon therein. The first phase of carbon is made up of the layer of carbon particles which may be trapped between adjacent strips of the filter pad. The second phase of carbon consists of the fine carbon particles which may be disposed within the internal cavities of the hollow fibers.

A filter element may be formed from the filter material according to the invention by attaching a circumferential edge frame to one or more filter bodies, substantially surrounding the top, bottom, and side surfaces thereof. The circumferential edge frame, where used, is formed from a different material than the filter pad. In a first orientation of the filter material in a filter element, the edge frame is placed around the filter pad such that when the filter element is used, at least some of the material to be filtered passes between adjacent filter strips thereof. In a second orientation of the filter material in a filter element, the edge frame is placed around the filter pad such that when the filter element is used, the material to be filtered passes through the interconnected filter strips thereof.

The present invention also contemplates a method of making a filter material. In practicing the method hereof, activated carbon is applied to at least one side of a thin sheet of fiber material comprising a plurality of nonwoven fibers.

After the carbon has been applied thereto, the sheet is then folded back and forth on itself many times, to form a multiplicity of interconnected filter strips.

The next step in the method hereof is compressing the folded sheet of fibrous material until the filter strips are oriented substantially parallel to one another, and the carbon is mechanically held between adjacent filter strips.

The next step in the method involves heating the folded and compressed sheet to fix and retain the substantially parallel orientation of the filter strips therein, forming the filter pad.

Optionally, the method may include an additional step of placing one or more filter pads into a frame, to form filter element adapted to directionally filter fluid therethrough, in a manner such that some of the fluid to be filtered passes between adjacent interconnected, substantially parallel filter strips.

Accordingly, it is an object of the present invention to provide an improved filter material.

It is another object of the present invention to provide a method of making the novel filter material.

It is a further object of the present invention to provide a filter element made using the improved filter material.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

Figure 1:
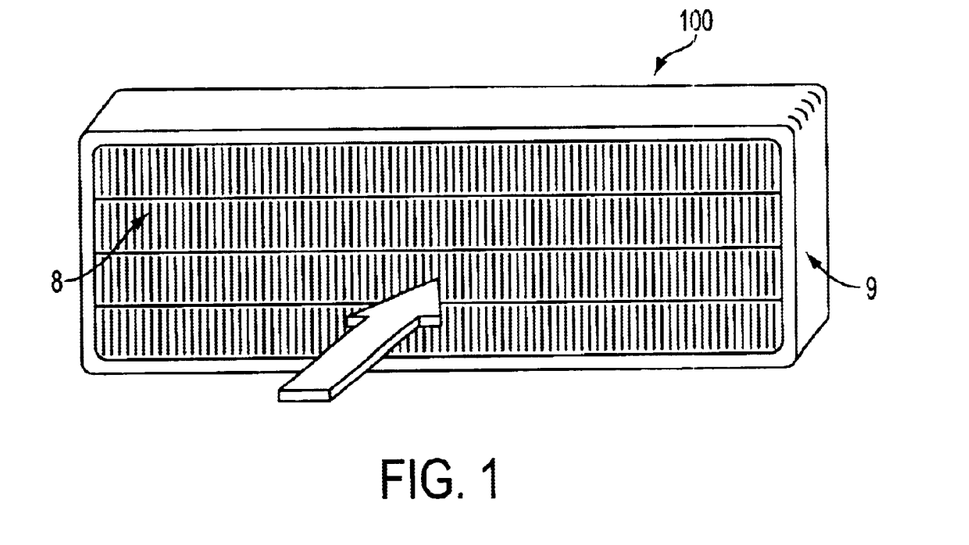
FIG. 1 is a perspective view of a filter element according to the present invention.

Referring now to FIG. 1 of the drawings, a filter element according to the present invention is shown generally at 100. The direction of filtration through the filter 100 is shown by the large arrow in the drawing. As will be further detailed herein, the filter material hereof is oriented in the filter element such that in use, at least some of the filtrate passes between adjacent filter strips therein.

The filter element 100 of FIG. 1 includes an array of four filter pads 8 stacked vertically on top of one another, and an edge frame 9 extending circumferentially around the perimeter of the array. Any number of filter pads 8 may be used in forming the filter element 100, depending on the specific application and design of the filter, and the filter element of FIG. 1 is provided as one illustrative example. The edge frame 9 does not cover the rear surface of the filter pads 8, so that the material to be filtered passes freely through the filter element 100, in the direction shown.

Figure 2A:
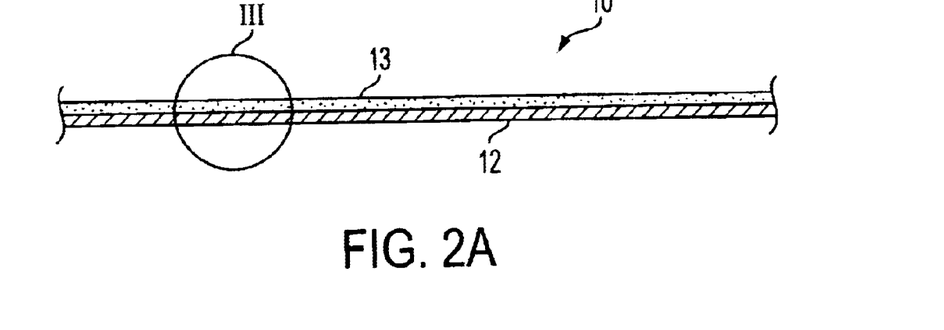
FIG. 2A is a cross-sectional view of a portion of two-layered fibrous sheet material, suitable for forming into a filter material according to the invention.
Figure 2B:
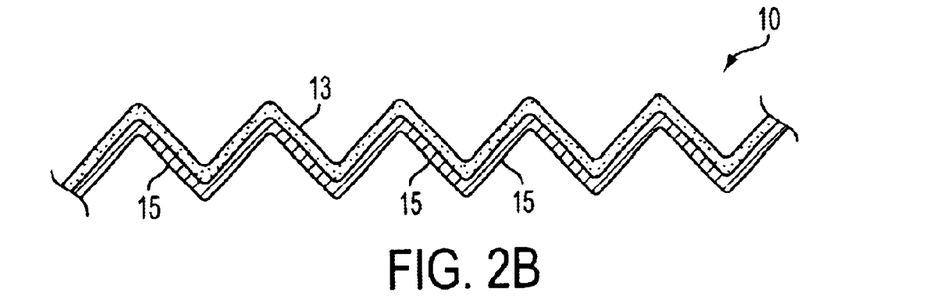
FIG. 2B is a cross-sectional view of the material of FIG. 2A, showing a plurality of folds being formed therein.
Figure 2C:
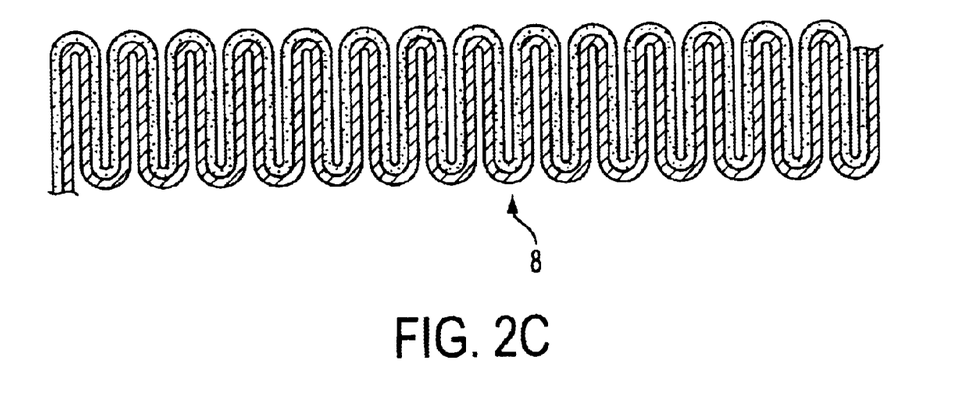
FIG. 2C is a cross-sectional view of the fibrous sheet of FIGS. 2A–2B, showing the material compressed into an accordion-pleated configuration to form a filter pad.
Figure 8:
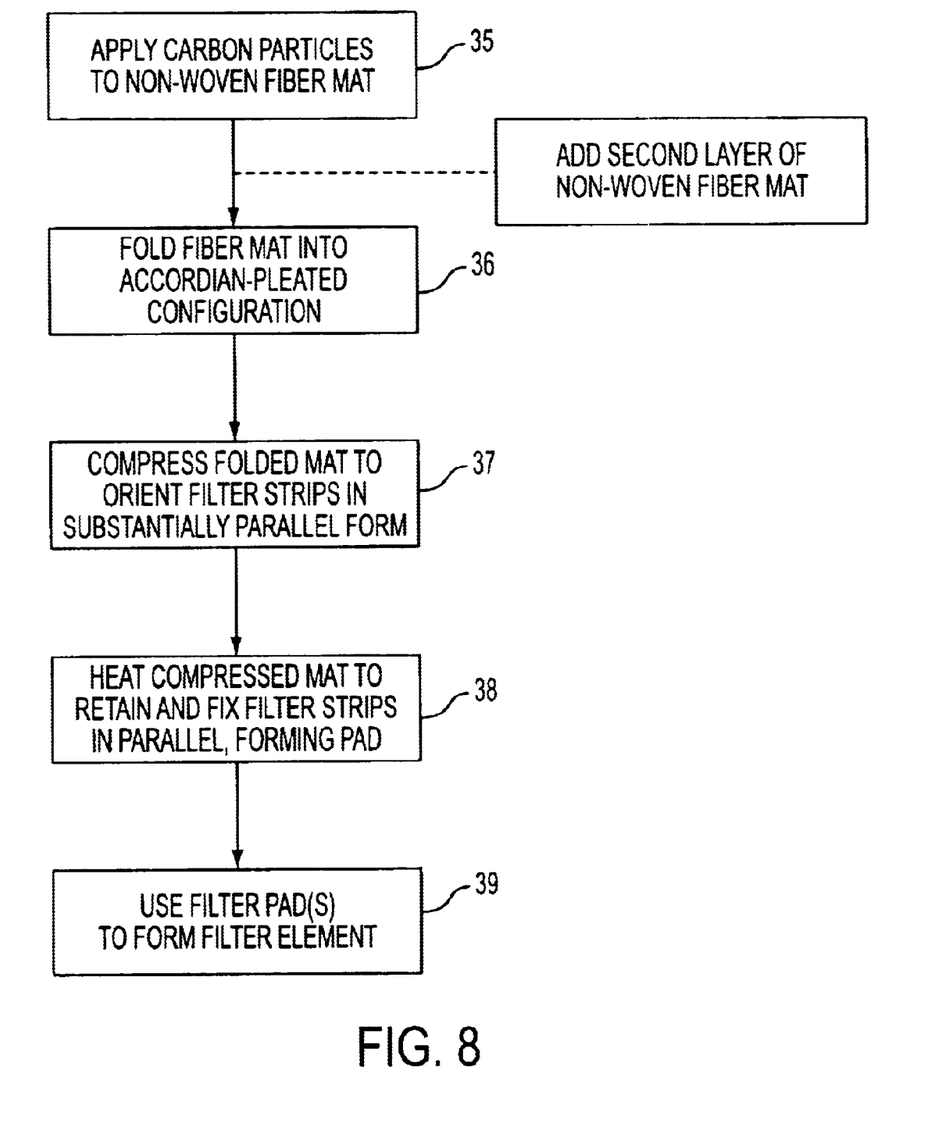
FIG. 8 is a block diagram showing steps in a preferred method of making a filter material according to the present invention.

A sequence of stages in the formation of a filter pad 8, in accordance with the present invention, is illustrated in FIGS. 2A–2C, and a sequence of steps in a preferred method of forming a filter pad is shown in the diagram of FIG. 8.

Figure 3:
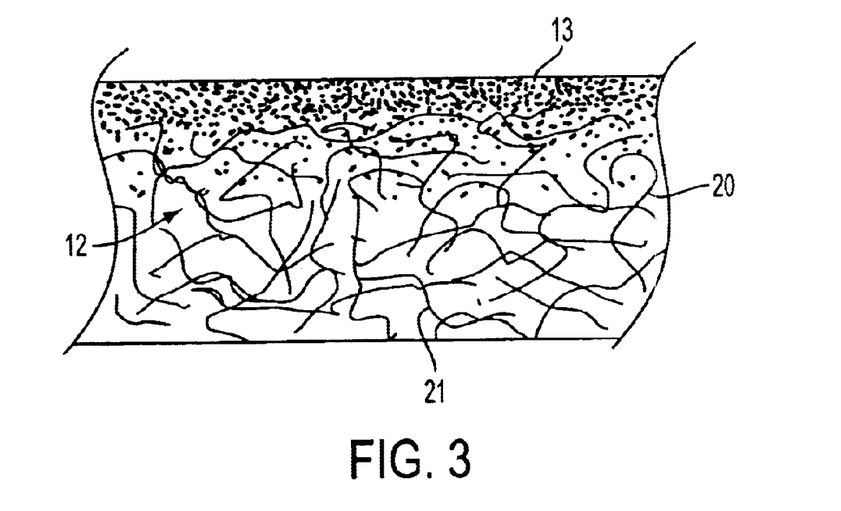
FIG. 3 is a detail view of the material of FIG. 2A, taken within the area labeled III in FIG. 2A and showing individual fibers of the nonwoven material.

As seen best in FIGS. 2A and 3, the starting material for use in forming the pad 8 is a thin fibrous sheet 10, including a fiber mat 12 and a thin coating 13 of carbon particles 14 applied thereto. The fiber mat 12 is formed from intermeshed non-woven fibers 20, 21 (FIG. 3).

A portion of at least one surface of the fiber mat 12 is initially coated with a layer 13 of finely divided activated carbon particles 14. Preferably, substantially the entire surface of at least one side of the fiber mat 12 has a coating of carbon particles 14 thereon, as shown. The step of applying carbon to the fiber mat 12 is shown at 35 in the method diagram of FIG. 8.

Figure 4:
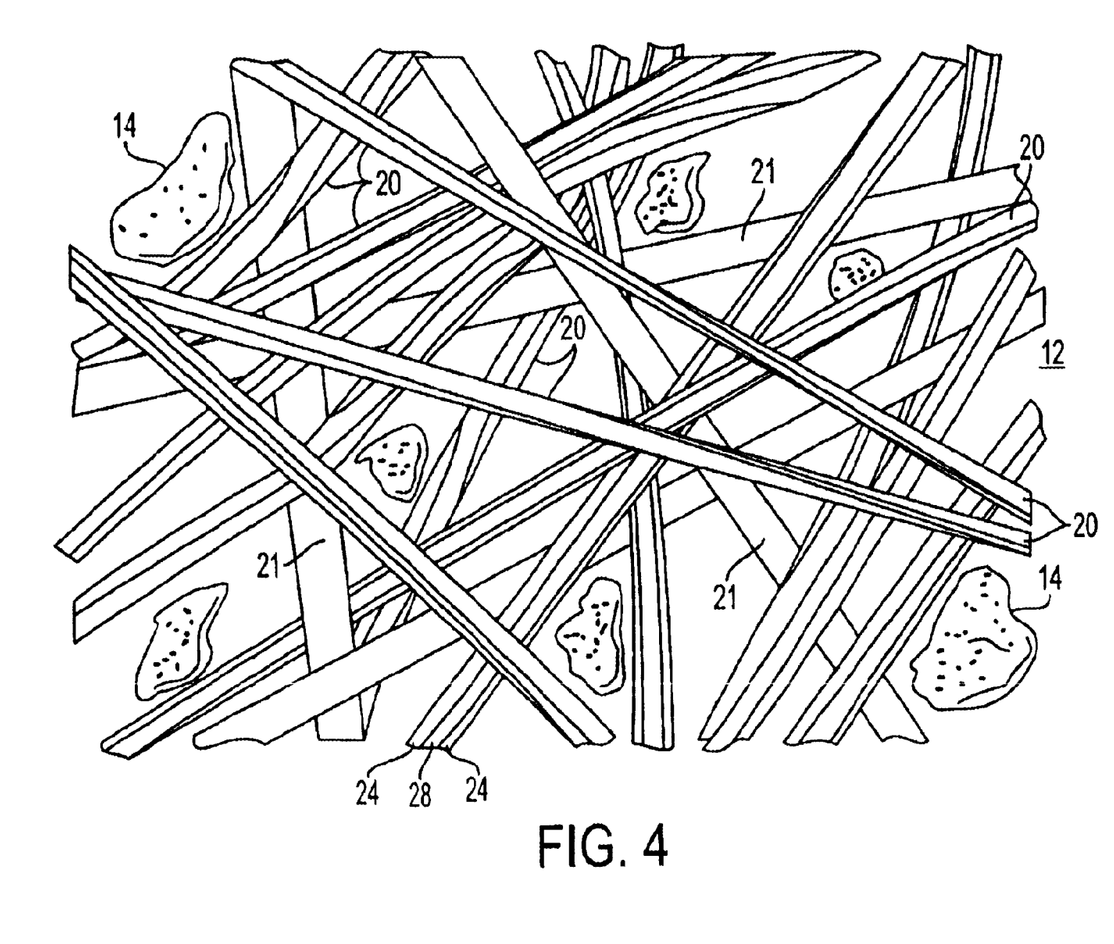
FIG. 4 is an enlarged perspective detail view of a nonwoven mat formed of hollow fibers, which is part of the sheet of FIGS. 2A and 3.

Immediately after application, most of the particles 14 enter the fiber mat 12 and lodge in the open interstices between the respective fibers 20, 21 thereof (FIG. 4).

The drawings in FIGS. 2A–2C and 3 are simplified for illustrative purposes, and are not intended to be drawn to scale. Although the layer of carbon particles 14 is shown as a relatively thick, separate layer in FIGS. 2A–2C, in a given application, the carbon particles 14 may initially form a layer 13 which is considerably thinner than the thickness of the fiber mat 12, as shown in FIG. 3. Moreover, it will be understood that most of the carbon particles 14 will migrate into the fiber web 12, ending up in the open interstices between the fibers 20, 21 of the fiber web, as noted. The end result will not be two layers, but rather, will be a single layer of intermingled fibers and carbon particles, as shown in FIG. 4.

The Fibers

The fiber mat 12 includes a multiplicity of randomly intertwined hollow fibers 20 intermixed with solid fibers 21, as shown in FIGS. 3–4. Preferably, hollow fibers 20 are provided in a range between 5 percent and 80 percent of the total fibers making up the mat 12.

The fiber mat 12 may be formed from a small number of substantially continuous extended-length fibers, in which a fiber is wrapped back on itself multiple times. Alternatively, the mat 12 may be formed from a multiplicity of chopped fiber sections, randomly oriented and distributed in a matrix.

The solid fibers 21 may be a mixture of fibers formed from different materials, as appropriate. The solid fibers 21 may include binder fibers, selected to melt at a lower temperature than the melting point of the other fibers, in order to melt and adhere the other fibers to one another, in order to fix and retain the accordion-pleated shape of the pad 8 after it has been formed. The binder fibers may be made of polyethylene, polyethylene terephthalate (PET), or mixtures thereof. Alternatively, the binder fibers may be made of other suitable melting-point materials known to those in the art.

A hollow fiber that is particularly suitable for use in practicing this invention is disclosed in U.S. Pat. No. 5,057,368, the disclosure of which is incorporated by reference. U.S. Pat. No. 5,057,368 is co-owned by the assignee of the present invention.

Figure 5:
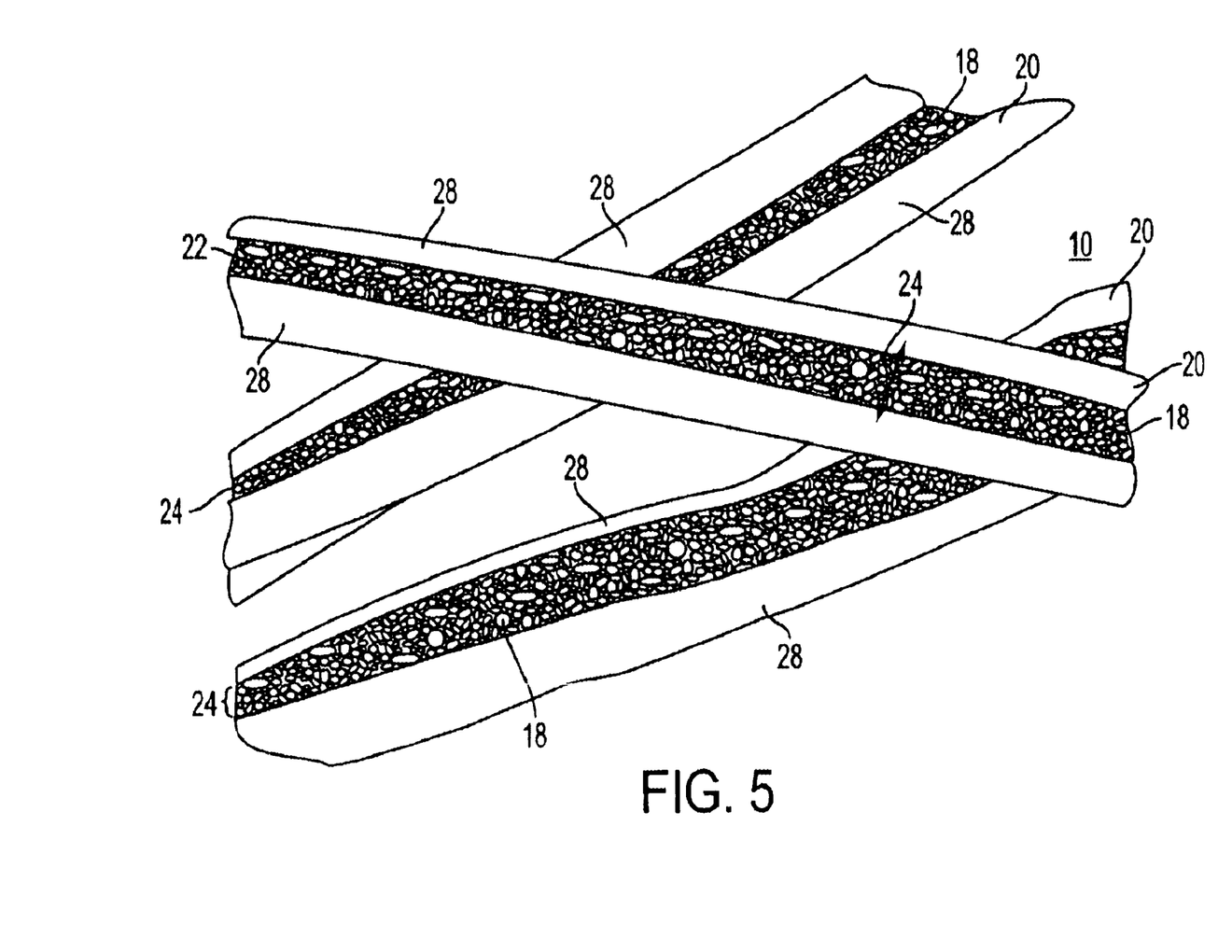
FIG. 5 is a further enlarged perspective detail view of the nonwoven fiber mat of FIG. 4, showing a solid component entrained in cavities of the fibers.
Figure 6:
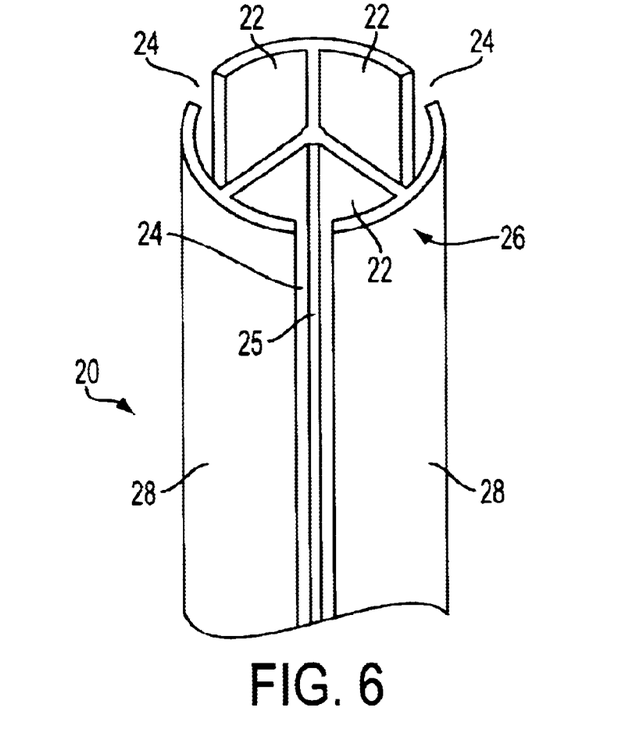
FIG. 6 is an enlarged perspective view of a three-lobed hollow fiber, which is usable in the practice of the present invention.

FIGS. 4–6 show the fiber sections 20, 21 making up the mat 12, in an increasing level of detail and magnification in each succeeding figure.

FIG. 4 shows a detail view of a number of intertwined sections of fiber 20 making up the mat 12.

FIG. 5 shows a further magnified detail view of three of the fiber sections 20, and also shows a plurality of carbon particles 18 which may be disposed in hollow spaces within the fibers 20.

FIG. 6 is a close-up detail perspective view of an end of one preferred fiber 20, with the carbon particles omitted from the drawing, for illustrative purposes.

The hollow fiber 20, as illustrated in FIG. 6, is formed as an extruded strand having one or more hollow longitudinally extending interior cavities 22, each of which communicates with the outer strand surface 28 by way of a longitudinally extending slot 24 defined between adjacent lobes 26.

The hollow fibers 20 may be made of one or more thermoplastic materials, such as polyolefins, fluoropolymers, polyimides, polysulfones, polyesters, polyamides, and mixtures thereof; or other suitable polymeric material which may be formed into the desired configuration, and which is stable with respect to the fluid intended to be filtered therethrough.

Each of the hollow fibers 20 fiber has a central core or stem 25, and a plurality of substantially T-shaped lobes 26 (FIG. 6). The lobes 26 are integrally attached to, and extend radially outwardly from, the central core 25. The legs of the lobes 26 intersect at the core 25, so that the angle between the legs of adjacent lobes is from about 80 degrees to 130 degrees.

As shown in FIG. 5, the hollow interior cavities 22 of the hollow fibers 20 may hold and retain a plurality of solid carbon particles 18 therein.

It will therefore be understood that the filter material hereof may include two separate and distinct phases of activated carbon therein, to assist in filtration. The first phase of carbon is made up of the layer of carbon particles 14, which may be trapped between adjacent strips 15 of the filter pad 8 and/or may be dispersed within the fiber mat 12. The second phase of carbon consists of the fine carbon particles 18 which may be disposed within the internal cavities of the hollow fibers.

In the embodiment of the fiber shown in FIG. 6, the three cross-sectionally T-shaped lobes 26 may have their outer surface 28 curved, as shown, or straight. While the hollow fiber 20 is depicted as tri-lobed in FIG. 6, it will be understood that any other number of lobes are suitable, particularly two, four or five lobes.

Figure 7:
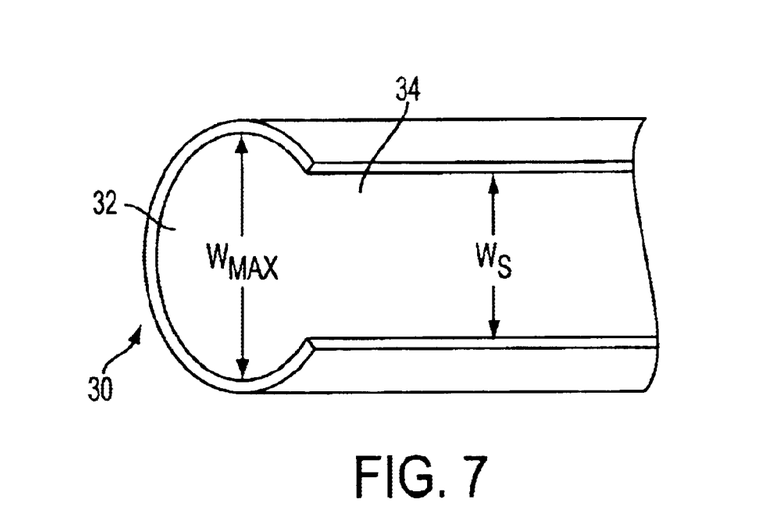
FIG. 7 is an enlarged perspective view of an alternative hollow fiber having a C-shaped cross-section with a single cavity formed therein, and which is also usable in the practice of the present invention.

FIG. 7 shows an alternative configuration for a fiber 30, which is usable in the practice of the present invention. The fiber 30 shown in FIG. 7 has a C-shaped cross-section, with only a single longitudinally extending internal cavity 32, and a single longitudinally extending slot 34. Other cross-sectional shapes may also be suitable. The specific shape of the hollow fibers is not critical, so long as the fibers have internal cavities formed therein. Most preferably, the maximum width of the internal fiber cavities is greater than the slot width.

The hollow fibers 20, 30 are relatively small, having a diameter in a range between 30 and 250 microns. The width $W_S$ (FIG. 7) of the longitudinally extending slots 24, 34 is normally less than one half of the diameter of the fibers 20 or 30. As a result, the interior cavity 22, 32 has a maximum width WMAX which is larger than the width $W_S$ of the respective slot 24 or 34.

Alternative Embodiment Formed From Three-Layered Laminate

Figure 9A:
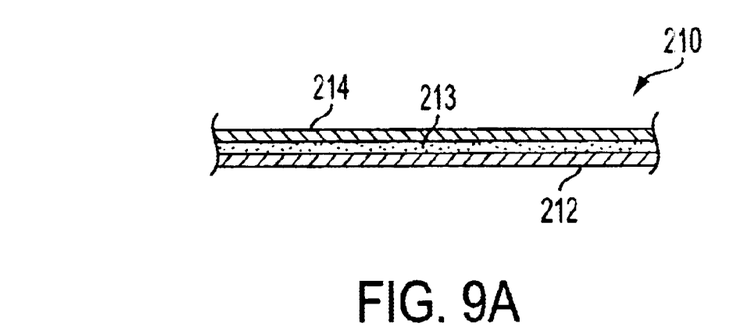
FIG. 9A is a cross-sectional view of a portion of three-layered fibrous sheet material, suitable for forming into a filter material according to the invention.
Figure 9B:
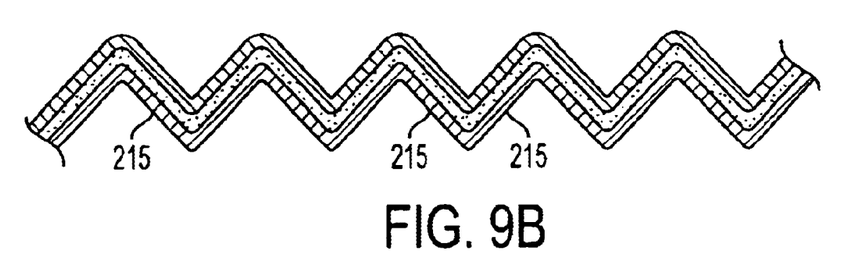
FIG. 9B is a cross-sectional view of the material of FIG. 9A, showing a plurality of folds being formed therein.
Figure 9C:
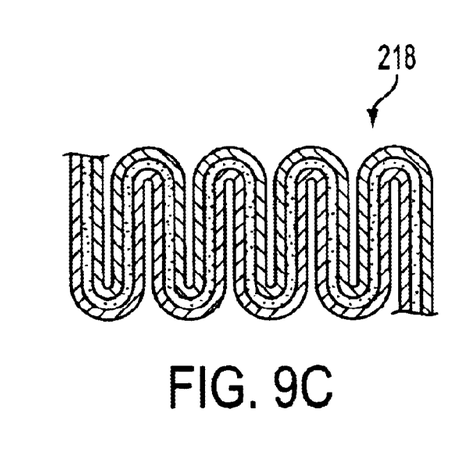
FIG. 9C is a cut-away cross-sectional view of the fibrous sheet of FIGS. 9A–9B, showing the material compressed into an accordion-pleated configuration to form a filter pad.

In one particular embodiment of the invention, as shown in FIGS. 9A–9C, two thin fibrous mats 212, 214 may be placed in overlapping relation parallel to one another, with a layer 213 of carbon particles sandwiched therebetween. Each of the fibrous mats 212, 214 is substantially identical to the fiber mat 12 in the sheet 10 according to the first embodiment. As previously noted, and in a manner similar to that discussed in connection with the first embodiment, the carbon particles of the carbon layer 213 migrate into the fibrous mats 212, 214 after application. A gradient of carbon distribution is therefore set up, with a significant carbon concentration in an area between the fibrous mats 212, 214, and with some of the carbon in the mats and between the fibers thereof.

The resulting laminated sheet material 210 is then accordion-folded as previously described, and the dual fibrous mats 212, 214 cooperate to substantially trap much of the carbon layer 213 therebetween, and hold it in place.

The sequence of steps shown in the diagram of FIG. 8 applies equally well to forming a filter pad 218 from the laminated sheet 210 of FIG. 9A. The laminate sheet 210 may be accordion-folded to form a multiplicity of thin filter strips 215 which are substantially parallel to one another in the resulting filter pad 218, and after the sheet 210 has been folded and compressed, it is preferably heated to fix the orientation of the strips 215.

The drawings in FIGS. 9A–9C are also simplified for illustrative purposes, and are not intended to be drawn to scale.

Method of Forming the Filter Pad

As shown in FIGS. 2B and 9B, after the carbon particles 14, 214 have been applied to a surface of the fiber mat 12, 212, optionally, a second fiber mat 214 may be placed in parallel and overlapping relation over the first mat 212.

After the carbon has been applied, whether or not a second fiber mat 214 is applied, the resulting fibrous sheet 10 or 210 is then folded back and forth a large number of times, in an accordion-pleated arrangement (FIGS. 2A–2C and 9A–9C). In folding the sheet 10, 210 in this way, a large number of interconnected filter strips 15, 215 are formed. This folding step is also shown at 36 in the method diagram of FIG. 8.

The next step in the method according to the invention is compressing the folded sheet 10, 210 to place the filter strips 15, 215 in substantially parallel relation to one another, as shown in FIGS. 2C and 9C. This compression step is shown at 37 in the method diagram of FIG. 8.

The next step in the method according to the invention is heating the filter pad 8, 218 to fix and retain the filter strips 15 or 215 in substantially parallel relation to one another. This heating melts the binder fibers that are provided in the web 12, as previously discussed, and the melting binder fibers act as a glue to fix the position of the remaining fibers 20, 21 in the filter pad 8, 218. This heating step is also shown at 38 in the method diagram of FIG. 8.

The resulting filter pad 8 or 218 is suitable for use in many filter applications, such as water filtration, air filtration, and/or other fluid filtration. The filter pad 8, 218 may be viewed as a filter body which is a fundamental unit of the present invention. The filter pad 8, 218 is an elastically resilient pad which is generally compressible and deformable, but which tends to spring back to its original shape after compression or bending.

Figure 2D:
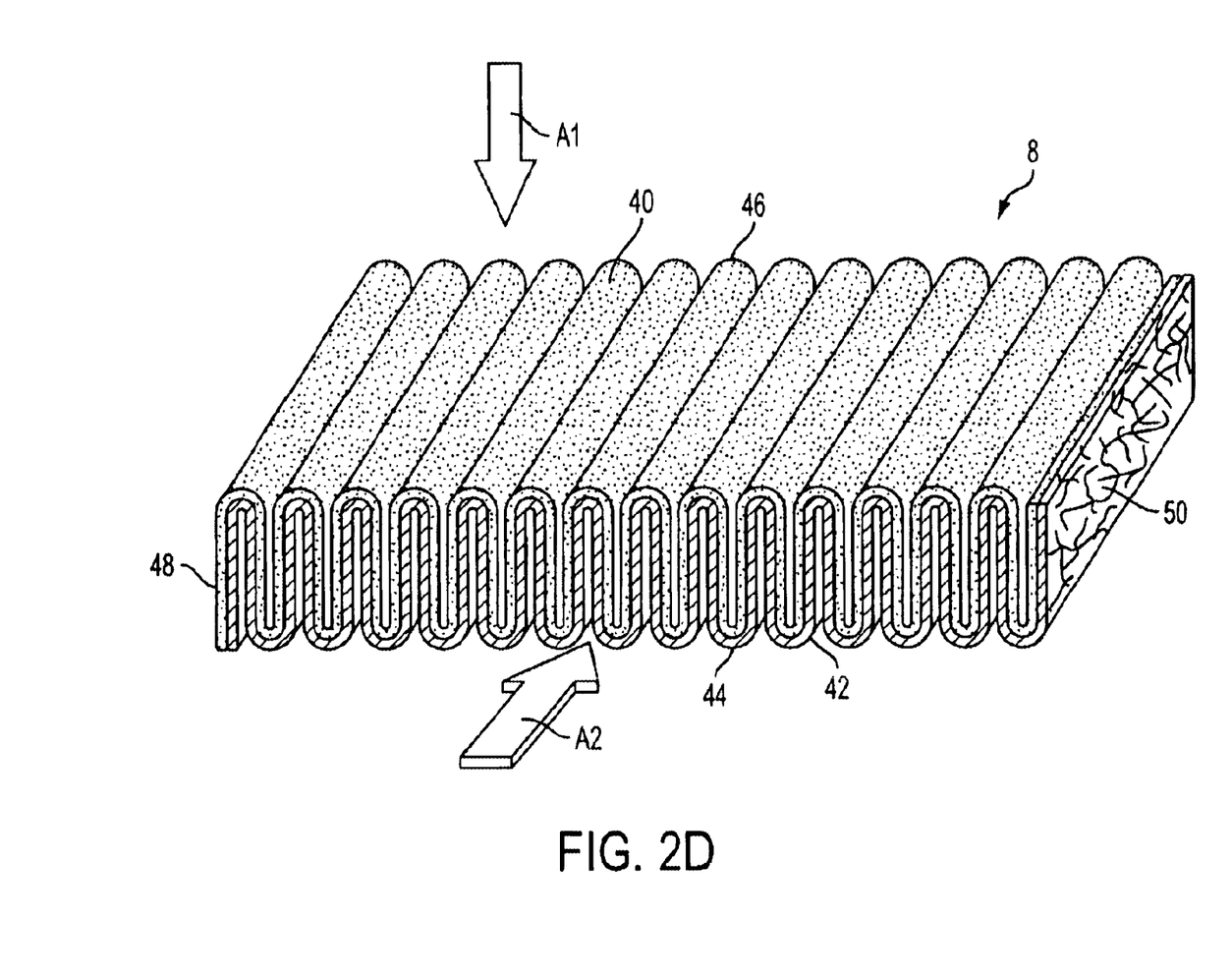
FIG. 2D is a perspective view of a filter pad in accordance with the present invention.

In the embodiment of FIG. 2D, the filter pad 8 is roughly parallelepiped or box-shaped, including a top surface 40, a bottom surface 42, a front 44, a rear surface 46, and two opposed side surfaces 48, 50. The side surfaces 48, 50 of the filter pad 8 are substantially parallel to the filter strips 15 throughout the pad. Fluid flow through the pad 8 may be in the direction shown by either of the large arrows A1 or A2 in FIG. 2D.

This rectangular box shape is provided as an illustration, rather than as an exclusive form that the filter pad 8 may take. The filter pad 8 may be made in other shapes and configurations, different from that shown in the drawings, without departing from the scope of the present invention.

Two or more filter pads 8 may be surrounded by a suitable edge frame 9 to form a filter element, of the general type shown in FIG. 1. The material selected for the edge frame 9 may be a flexible resilient foamed elastomer, or may be other material, depending on the application.

The presence of carbon particles 14, 18 at two levels of the present filter material 8 provides superior removal of unwanted contaminants and the like. In addition, the use of the material 8 to filter a fluid by passing it 'between' adjacent filter strips, and through the filter pad 8 in a direction substantially parallel to the orientation of the filter strips, means that the filter material hereof will only create minimal flow resistance, while still adequately filtering liquids which are passed therethrough.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having, thus, described the invention, what is claimed is:

1. A filter material, comprising:

a filter pad comprising a thin nonwoven mat comprising a plurality of hollow fibers, which mat has been accordion-pleated so that the mat includes a plurality of pleats, compressed into a unit having a multiplicity of substantially parallel interconnected filter strips, and treated to retain the filter strips in substantially parallel relation to one another;

said hollow fibers including at least one longitudinally extending open cavity within the fibers having carbon particles disposed therein;

said mat further including carbon particles disposed between said pleats outside of said longitudinally extending open cavity.

2. The filter material of claim 1, wherein substantially every filter strip of said material is closely spaced with respect to, or is in contact with an adjacent filter strip.

3. The filter material of claim 1, wherein said hollow fibers comprise a central stem and a plurality of substantially T-shaped lobes extending radially outwardly from the stem.

4. The filter material of claim 3, wherein said hollow fibers comprise three lobes.

5. A fluid filter element, comprising:

a filter body comprising at least one filter pad, said filter pad comprising a thin nonwoven mat comprising a plurality of hollow fibers having at least one longitudinally-extending open channel with carbon particles disposed therein, which mat has been accordion-pleated so that the mat includes a plurality of pleats and having further carbon particles disposed outside of said longitudinally-extending open channel between said pleats, compressed into a unit having a multiplicity of substantially parallel interconnected filter strips, and treated to retain the filter strips in substantially parallel relation to one another; and a circumferential edge frame attached to and substantially surrounding said filter body, wherein said circumferential edge frame is formed from a different material than the filter body;

wherein said filter body is oriented in said edge frame such that when said filter element is used, at least some of the material to be filtered passes between adjacent filter strips of said filter pad.

6. The fluid filter element of claim 5, wherein substantially every filter strip of said pad is closely spaced with respect to, or is in contact with an adjacent filter strip.

7. The fluid filter element of claim 5, wherein said hollow fibers comprise a central stem and a plurality of substantially T-shaped lobes extending radially outwardly from the stem.

8. The fluid filter element of claim 7, wherein said hollow fibers comprise three lobes.

* * * * *